J. BECKER.
FINDER.
APPLICATION FILED DEC. 12, 1916. RENEWED AUG. 31, 1918.
1,283,633.
Patented Nov. 5, 1918.
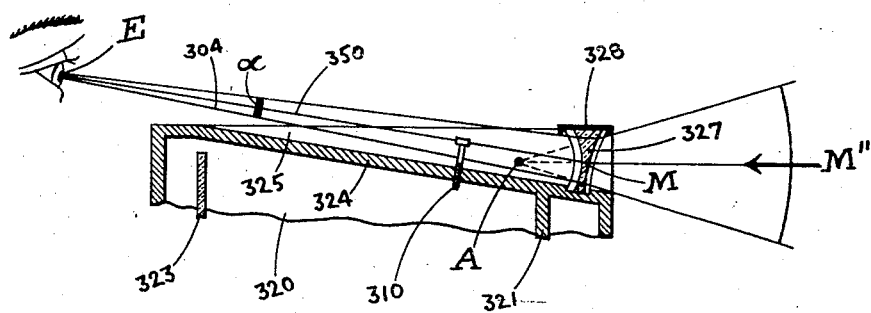
Inventor
Joseph Becker

UNITED STATES PATENT OFFICE.

JOSEPH BECKER, OF WASHINGTON, DISTRICT OF COLUMBIA, ASSIGNOR TO EASTMAN KODAK COMPANY, OF ROCHESTER, NEW YORK, A CORPORATION OF NEW YORK.

FINDER.

1,283,633.  Specification of Letters Patent.  Patented Nov. 5, 1918.

Original application filed February 17, 1905, Serial No. 246,169. Divided and this application filed December 12, 1916, Serial No. 136,428. Renewed August 31, 1918. Serial No. 252,262.

*To all whom it may concern:*

Be it known that I, JOSEPH BECKER, a citizen of the United States, residing at Washington, in the District of Columbia, have invented a new and useful Improvement in Finders, of which the following is a specification.

The present application, identified for convenience of reference as Case Ar, is Division four of my prior application Case J, Serial No. 246,169, filed February 17, 1905, now Patent 1,210,136, issued Dec. 26, 1916; and it relates to certain features of said Case J which are separately patentable under the head of finders.

My present invention consists in a simple, inexpensive, and very convenient modified form of the adjustable finder shown in Figures 10 and 11 of my Case Aq or Division three of J, filed December 11, 1916 Serial No. 136,293.

The accompanying drawing shows it in vertical section.

On referring to the said Figs. 10 and 11 of my said Case Aq, it will be seen that vertical adjustment of the line of sight is obtained in that structure by a horizontal adjustment of the rear sight.

In the present structure the same vertical adjustment of the line of sight is secured by vertical adjustment of the rear sight.

The camera box 320, partition 321, plate 323, floor 324, wall 325, lens 327, and keeper 328 are, respectively, identical with the similarly numbered parts of Figs. 10 and 11. But the rear sight here is a simple pin or screw 310 driven into the flooring 324 of the sighting recess and adapted to act on the central finder 350, instead of on the lowest rays 304. Lateral adjustment is provided for by starting the pin or screw in the proper lateral position; and then, by driving the pin or screw more or less its head can be accurately brought into the path of the central finder ray 350, as seen in the figure. This constitutes a very simple, accurate and convenient form of finder.

The pyramid of rays from the finder lens 327 to the eye at E is indicated here, as in my said Case Aq, by a heavily marked arc alpha ($\alpha$).

What I claim as my invention and desire to secure by Letters Patent is:

The combination with a camera and an eccentric divergent lens mounted thereon, as a finder, of a sight mounted adjustably on the camera between the said lens and the position to be occupied by the operator's eye; said sight consisting in a diminutive post adapted to be driven at any desirable point of, and to any desirable depth into, a part that remains stationary with relation to the said finder lens while the same is in use.

In testimony whereof I have signed my name to this specification.

JOSEPH BECKER.